United States Patent
Meszaros et al.

(10) Patent No.: US 9,278,650 B2
(45) Date of Patent: Mar. 8, 2016

(54) STEP PAD CARGO SYSTEM

(71) Applicant: Ford Global Technologies, LLC, Dearborn, MI (US)

(72) Inventors: Edward Joseph Leonard Meszaros, Amhesrtburg (CA); David Thomas Patrick, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 109 days.

(21) Appl. No.: 14/070,672

(22) Filed: Nov. 4, 2013

(65) Prior Publication Data

US 2015/0123373 A1  May 7, 2015

(51) Int. Cl.
*B60R 3/00* (2006.01)
*B60R 9/02* (2006.01)

(52) U.S. Cl.
CPC ... *B60R 9/02* (2013.01); *B60R 3/00* (2013.01); *B60R 3/002* (2013.01)

(58) Field of Classification Search
CPC ............ B60R 3/00; B60R 3/002; B60R 9/02; B60R 9/00; B60R 9/06; B60R 9/08; B60R 9/12; B60R 2011/004; B60R 2011/005; B60R 2011/0052
See application file for complete search history.

(56) References Cited

U.S. PATENT DOCUMENTS

| | | | | |
|---|---|---|---|---|
| 1,473,319 A * | 11/1923 | Ray | ............................. | B60R 9/02 206/373 |
| 1,493,854 A * | 5/1924 | Frey | ........................... | B60R 9/02 224/42.4 |
| 1,623,794 A * | 4/1927 | Klamroth | .................... | B60R 9/02 280/164.1 |
| 1,850,032 A * | 3/1932 | Reingold | ................... | B60R 9/02 280/164.1 |
| 2,512,291 A * | 6/1950 | Touhey | .................... | B61F 15/26 384/190.2 |
| 2,735,542 A * | 2/1956 | Schnitzler | ............... | B65D 85/54 206/228 |
| 3,055,534 A * | 9/1962 | Boenccke | ............. | B65D 43/164 206/754 |
| 3,659,999 A * | 5/1972 | Schurman | ........... | B29C 49/0031 425/160 |
| 3,828,969 A * | 8/1974 | Schurman | ........... | B29C 49/0031 220/324 |
| 4,449,628 A * | 5/1984 | Egly | ................... | G11B 33/0433 206/308.3 |
| 5,248,033 A * | 9/1993 | Kos | .................... | H01L 21/67386 206/454 |
| 6,019,238 A * | 2/2000 | Kindig | .................... | A47B 77/08 16/266 |
| 6,129,401 A * | 10/2000 | Neag | ........................ | B60N 3/08 296/183.1 |
| 6,270,099 B1 * | 8/2001 | Farkash | .................. | B60R 3/002 182/127 |
| 6,454,115 B1 * | 9/2002 | Allasia | ................. | B65D 43/162 206/540 |
| 7,290,657 B2 * | 11/2007 | Christensen | ............. | B25H 3/02 206/372 |
| 2009/0267374 A1 * | 10/2009 | Mulder | ................... | B60R 3/002 296/37.1 |
| 2009/0294497 A1 * | 12/2009 | Todorovic | ................. | B60R 9/02 224/402 |
| 2012/0098231 A1 * | 4/2012 | Huotari | ..................... | B60R 3/02 280/166 |
| 2015/0123373 A1 * | 5/2015 | Meszaros | .................. | B60R 9/02 280/164.1 |

OTHER PUBLICATIONS realtruck.com, Storage Running Boards—Running Boards with Storage, www.realtruck.com/running-boards/storage-boards/R204643.html#read_more_anchor, Aug. 28, 2013, two pages.

* cited by examiner

*Primary Examiner* — Brodie Follman
(74) *Attorney, Agent, or Firm* — Jason Rogers; Price Heneveld LLP

(57) ABSTRACT

A cargo step pad comprising a container having a bottom and a plurality of sidewalls defining an opening and a lid coupled to the container and operable between a closed position, wherein the lid extends laterally beyond the opening, and an opened position, wherein at least a portion of a back wall of the container is positioned within a volume defined by the inner surface of the lid.

18 Claims, 10 Drawing Sheets

US 9,278,650 B2

STEP PAD CARGO SYSTEM

FIELD OF THE INVENTION

The present invention generally relates to step pads for vehicles, more specifically, a cargo space disposed within a step pad for a vehicle.

BACKGROUND OF THE INVENTION

Many vehicles include step pads disposed proximate the passenger doors to assist passengers in entering and leaving the vehicle. Additionally, storage space in a vehicle is a primary concern such that storage space within a step pad can be utilized. The use of step pads as an additional location for storage space takes advantage of the sturdy construction of the step pad that can carry the weight of one or more people. The step pad can also include an interior volume that is used to store and protect items placed therein. The sturdy construction of the step pad can help to prevent damage to the stored items located within the step pad's interior volume during operation of the vehicle.

SUMMARY OF THE INVENTION

One aspect of the present invention includes a cargo step pad for a vehicle comprising a container having a rear wall at least partially defining a container rim and a lid operable between open and closed positions. A portion of a top of the lid is positioned below the container rim and behind the rear wall when the lid is in the open position.

Another aspect of the present invention includes a cargo step pad for a vehicle comprising a container and a lid coupled to the container and operable between a closed position defined by an opening of the lid extending beyond an outer surface of the container, and an open position defined by a portion of a top of the lid being behind a rear wall of the container and below a rim of the container.

Yet another aspect of the present invention includes a cargo step pad comprising a container having a bottom and a plurality of sidewalls defining an opening, a lid coupled to the container and operable between a closed position, wherein the lid extends laterally beyond the opening, and an opened position, wherein at least a portion of a back wall of the container is positioned within a volume defined by the inner surface of the lid.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
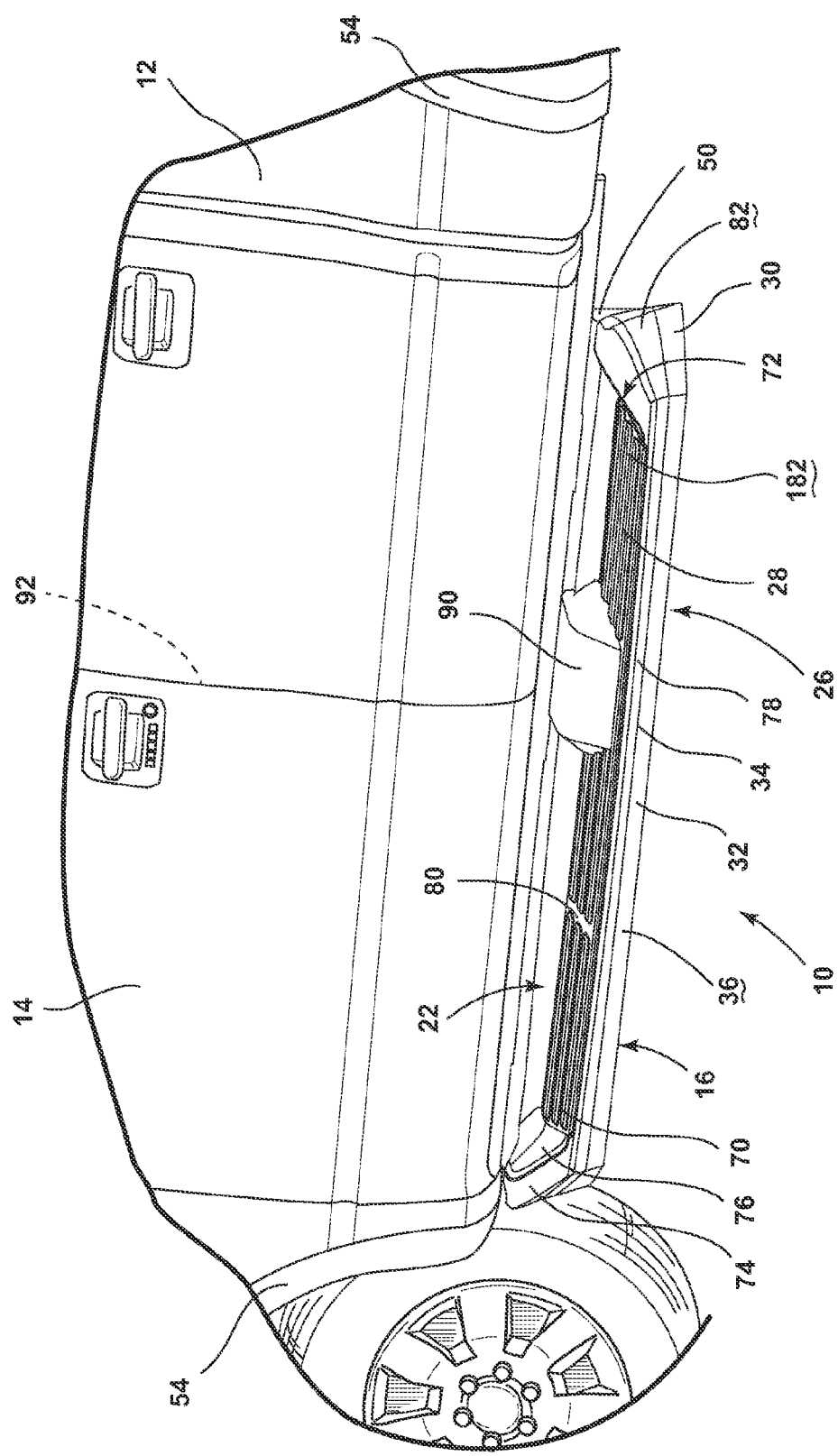
FIG. 1 is a side perspective view of one embodiment of a cargo step pad attached to the vehicle and with the lid in the closed position.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
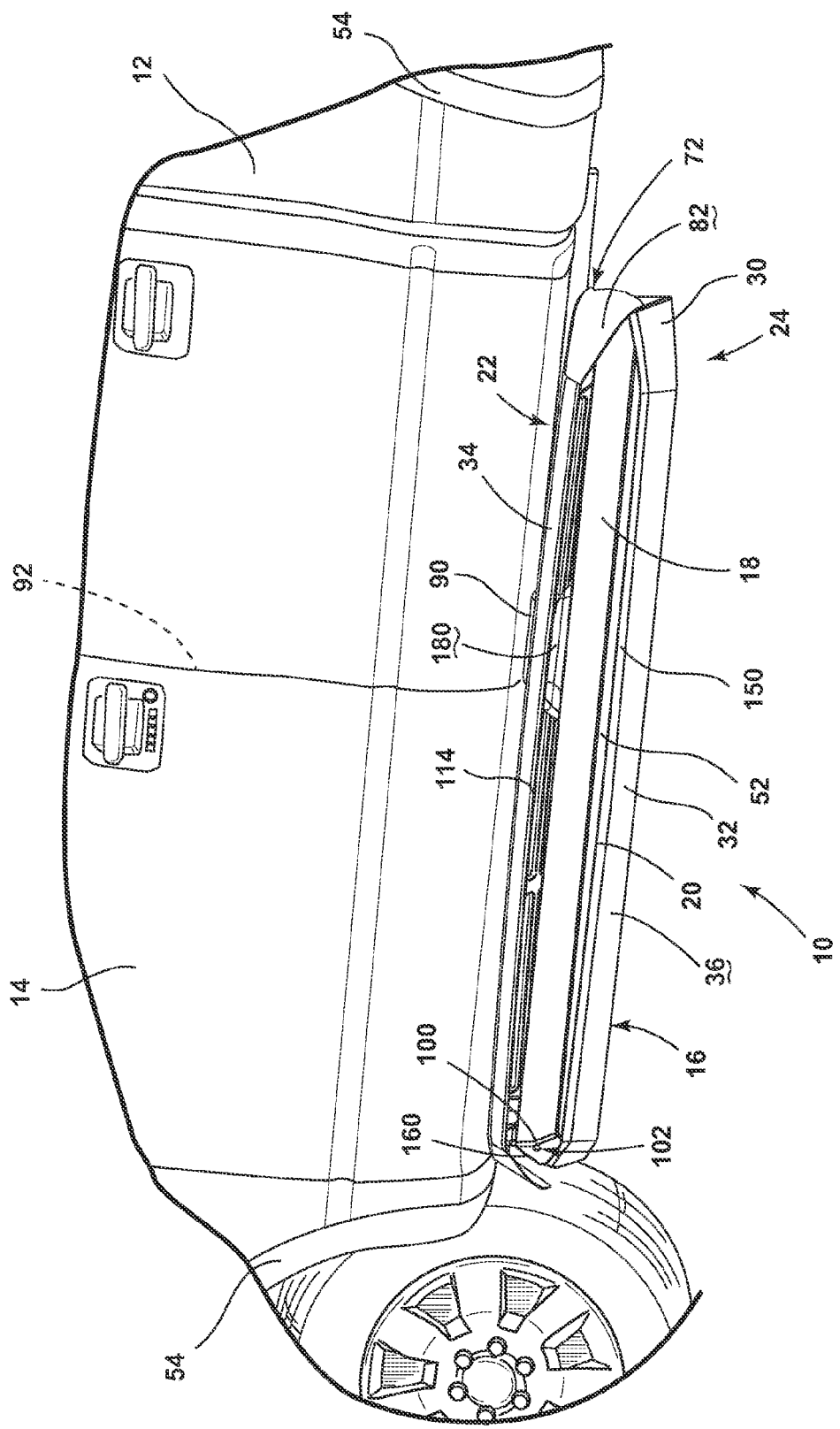
FIG. 2 is a side perspective view of the cargo step pad of FIG. 1 with the lid in the open position.
Figure 3:
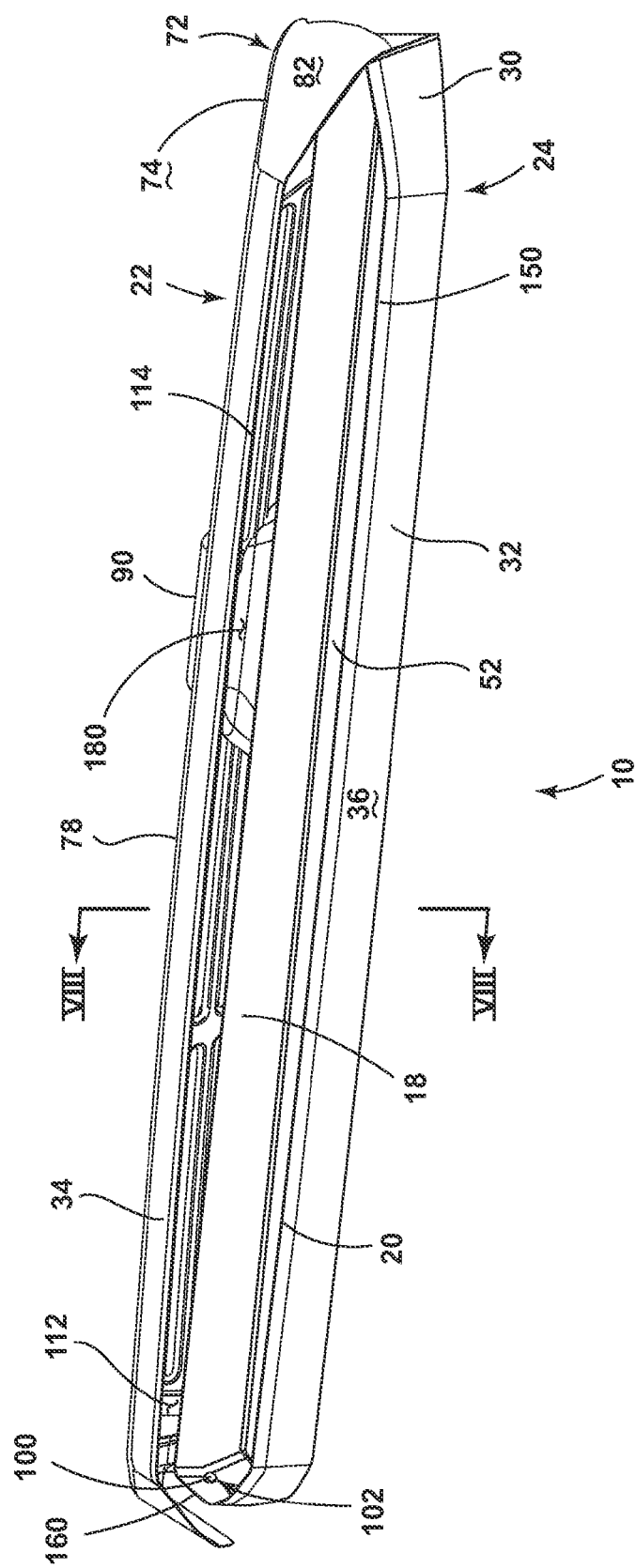
FIG. 3 is a side perspective view of another embodiment of the cargo step pad with the lid in the open position.
Figure 4:
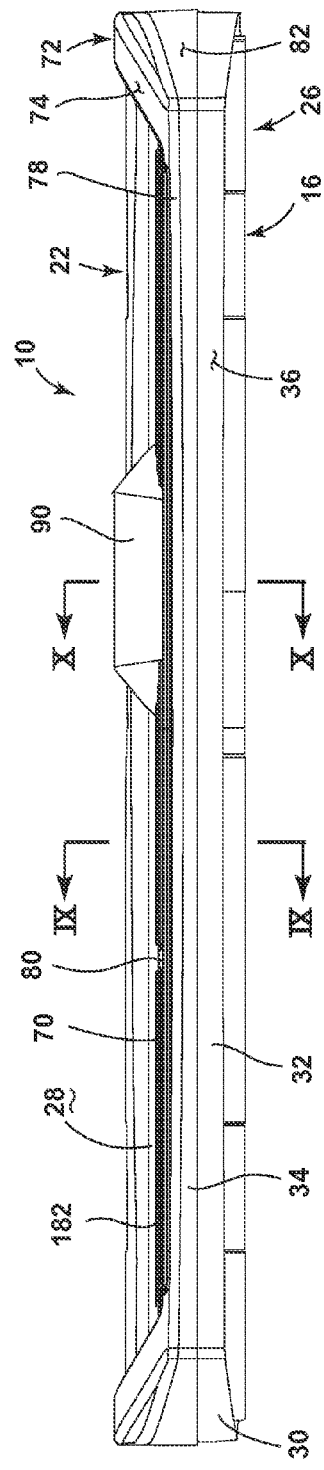
FIG. 4 is a first side elevation view of the cargo step pad of FIG. 3 with the lid in the closed position.
Figure 5:
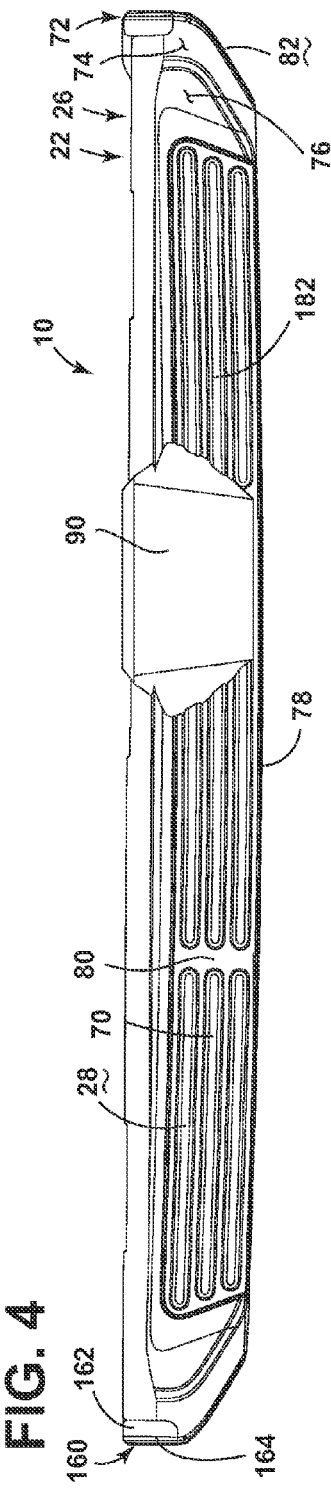
FIG. 5 is a top plan view of the cargo step pad of FIG. 4.
Figure 6:
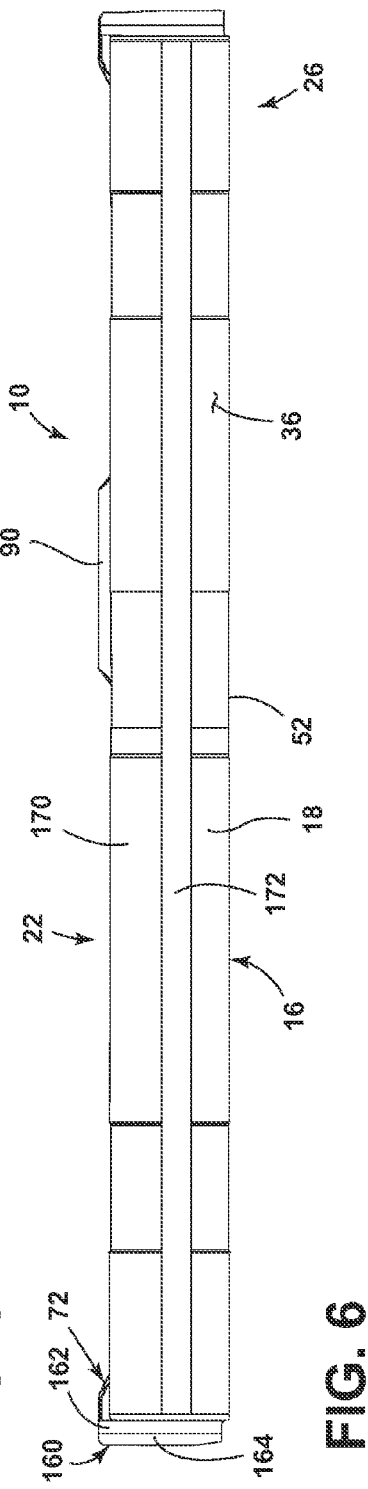
FIG. 6 is a second side elevation view of the cargo step pad of FIG. 4.
Figure 7:
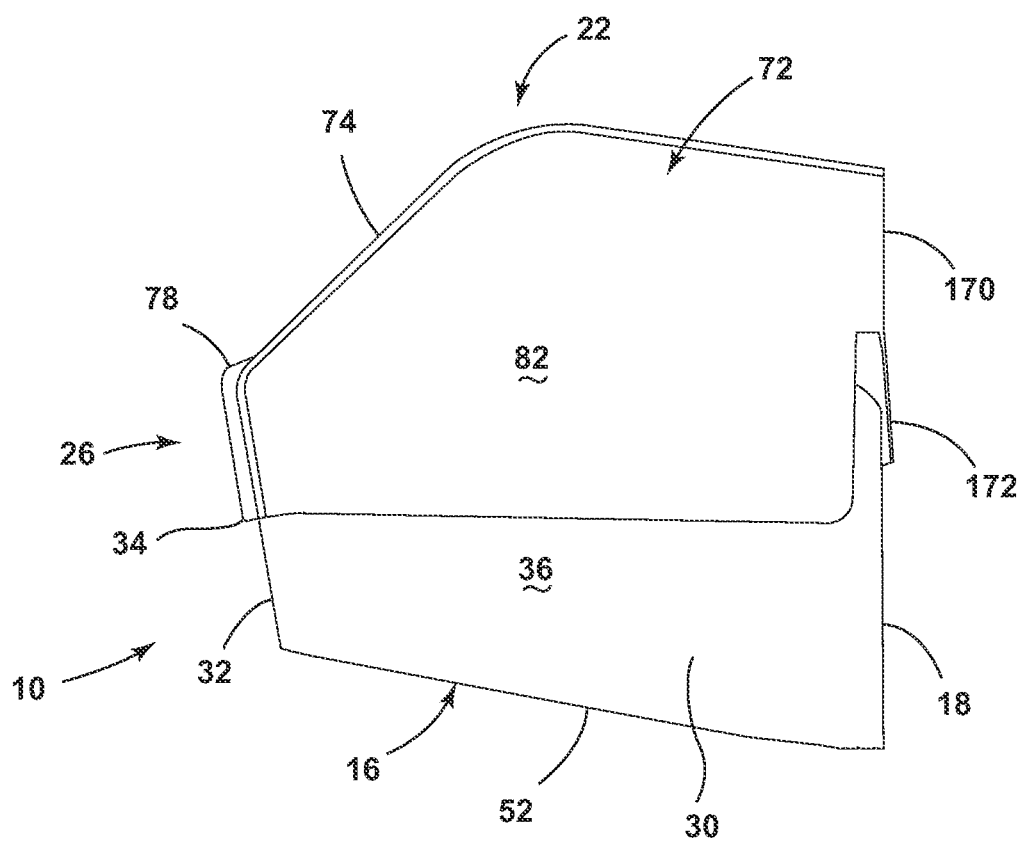
FIG. 7 is a third side elevation view of the cargo step pad of FIG. 4.
Figure 8:
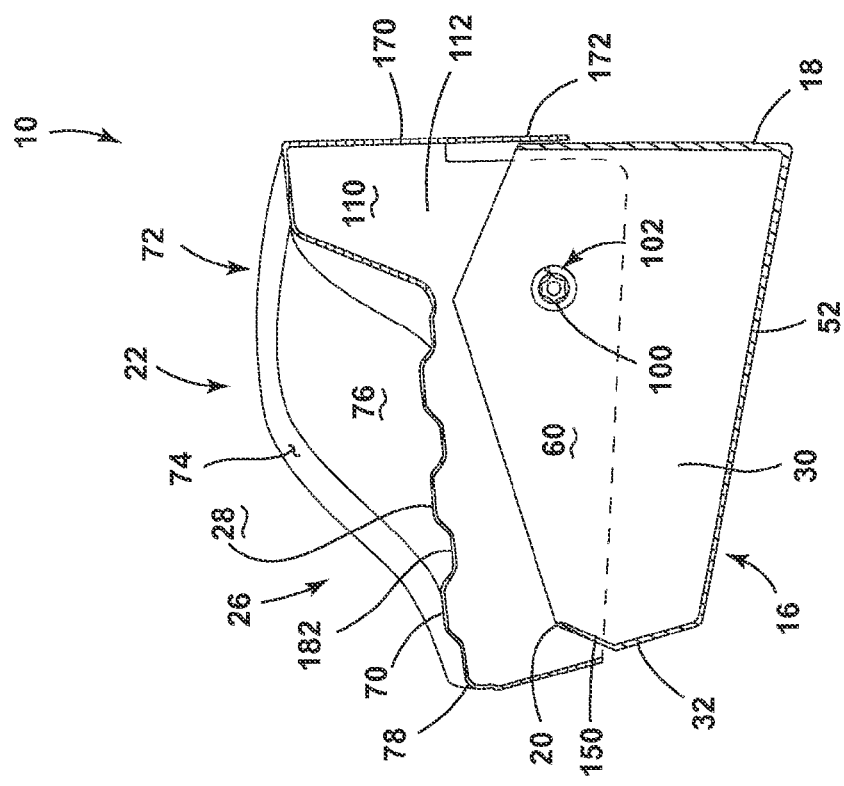
FIG. 8 is a cross-sectional view of the cargo step pad of FIG. 3 taken at line VIII-VIII.
Figure 9:
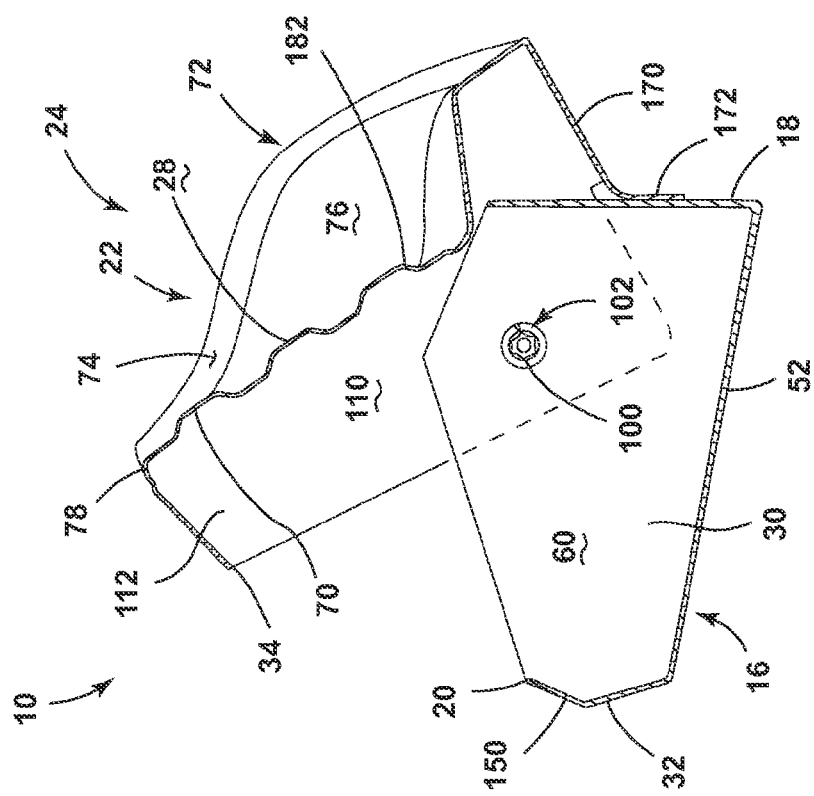
FIG. 9 is a cross-sectional view of the cargo step pad of FIG. 4 taken at line IX-IX.
Figure 10:
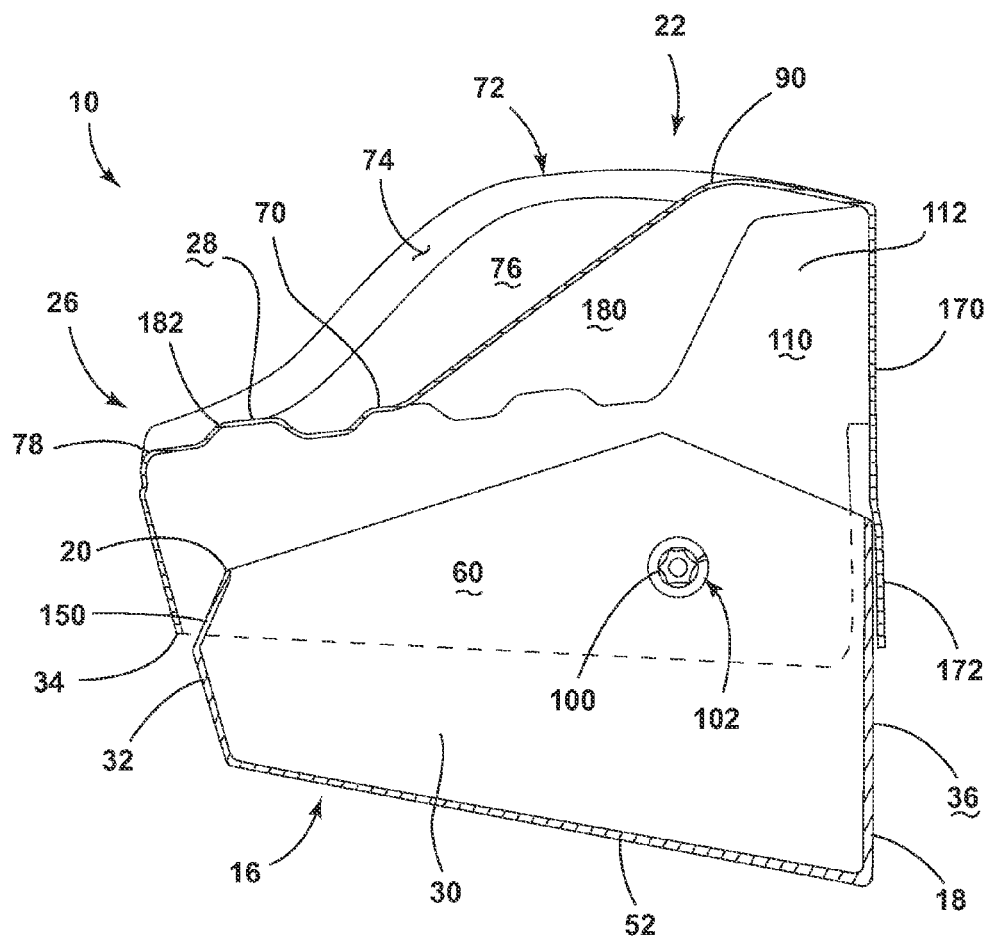
FIG. 10 is a cross-sectional view of the cargo step pad of FIG. 4 taken at line X-X.

As shown in FIGS. 1-3, reference numeral 10 generally refers to a cargo step pad 10 for a vehicle 12 disposed proximate the front and rear passenger doors 14 of the vehicle 12 and comprising a container 16 having a rear wall 18 that at least partially defines a rim 20 of the container 16. A lid 22 is operable between open and closed positions 24, 26, wherein a portion of the top of the lid 22 is positioned below the rim 20 and behind the rear wall 18 of the container 16 when the lid 22 is in the open position 24. The rim 20 is further defined by side walls 30 and a front wall 32, wherein the closed position 26 of the cargo step pad 10 is defined by a lip 34 of the lid 22 extending beyond an outer surface 36 of the front, side and rear walls 32, 30, 18 of the container 16.

As illustrated in FIGS. 1 and 2, the cargo step pad 10 is attached to one side of the vehicle 12 by a step pad frame 50 that extends laterally from the vehicle frame or vehicle body to the container 16 of the cargo step pad 10. The step pad frame 50 connects to the container 16 at the rear wall 18 and is attached by various methods that can include, but are not limited to, bolting, rivets, welding, and other substantially fixed connection methods. In various alternate embodiments, the step pad frame 50 can attach to the container 16 at a bottom wall 52 of the container 16, and attach thereto in any one of the methods described above. It is contemplated that the cargo step pad 10 can be installed on any one of a number of styles of vehicle, including, but not limited to, 2-door trucks, 4-door trucks, SUVs, CUVs, among others.

Referring again to FIGS. 1 and 2, the cargo step pad 10 is disposed between the front and rear tire wells 54 and includes a generally contoured shape so as to not substantially interfere with the aerodynamic properties of the vehicle 12. The bottom wall 52 of the container 16 of the cargo step pad 10 is positioned at a height sufficient to not interfere with the ground clearance parameters of the vehicle 12. The top surface 28 of the lid 22 of the cargo step pad 10 is positioned at a height sufficient such that users of the vehicle 12 can readily and conveniently use the cargo step pad 10 to access and leave the vehicle 12. The cargo step pad 10 is further configured to have a substantially similar size to conventional step pads, while also providing approximately 1.5 cubic feet of storage, within an interior volume 60 defined by the lid 22 and container 16, per cargo step pad 10. Various configurations of the cargo step pad 10 will have more or less interior storage space depending on the size of the cargo step pad 10 that will be attached to the vehicle 12. The amount of storage space within the cargo step pad 10 depends, in part, on the wheel base of the vehicle 12. Vehicles having a longer wheel base can accommodate longer cargo step pads 10 and, in turn, greater interior volume 60 and cargo capacity. In various embodiments, the cargo step pad 10 can be operable such that a motorized mechanism incorporated with the step pad frame 50 can be configured to retract the cargo step pad 10 to a position at least partially under the vehicle 12 when the vehicle 12 is in motion, and when the step pad may not be used, and also extend the cargo step pad 10 out from under the vehicle 12 when the vehicle 12 is stopped, such that occupants can use the cargo step pad 10 to enter or exit the vehicle 12.

As illustrated in FIGS. 1-5, the top surface 28 of the lid 22 includes a plurality of ridges 70 to provide a traction surface for the occupant of the vehicle 12 when entering and exiting the vehicle 12. The ridges 70 run along a length of the cargo step pad 10. Clearance protrusions 72 on the left and right side of the cargo step pad 10 have a sloped surface 74 that tapers from the rear to the front of the cargo step pad 10. Additionally, the clearance protrusions 72 can include diagonal surfaces 82 that allow for clearance around the front and rear tire wells 54. Each clearance protrusion also includes a drainage surface 76, wherein the sloped surface 74 of the clearance protrusion and the drainage surface 76 channel water away from the top surface 28 of the lid 22. Water that runs down the sloped surface 74 of the clearance protrusion is directed toward a front edge 78 or rear of the lid 22 and away from the vehicle 12. Water that runs down the drainage surface 76 is directed through the ridges 70 of the lid 22 and to one or more drain channels 80 disposed in the top surface 28 of the lid 22. The drain channels 80 in the top surface 28 run substantially perpendicular to the ridges 70 and allow water to run toward the front edge 78 or rear of the lid 22 and off of the cargo step pad 10. Additional traction-enhancing components can be included on the top surface 28 of the lid 22 that include, but are not limited to, abrasive surfaces, traction-enhancing geometries, or other similar components.

In various embodiments, the ridges 70 can be configured in alternate geometries that include, but are not limited to, arcuate or irregular patterns, diagonal, angular, alternate linear configurations, or other similar configurations that allow water to drain off from the top surface 28 of the lid 22 of the cargo step pad 10. In both the open and closed positions 24, 26, the lid 22 can also include one or more storage protrusions 90 disposed between the clearance protrusions 72 of the lid 22. As will be described more fully below, the storage protrusion 90 defines an expanded portion 180 of the interior volume 60 of the cargo step pad 10 that is defined by the interior surface of the lid 22 and the interior surface of the container 16. The storage protrusion 90 can be disposed in a non-stepping portion of the cargo step pad 10, typically in-line with the "B"-pillar 92, which is a center pillar that extends vertically between the front and rear passenger doors 14 on either side of the vehicle 12. In various embodiments, more than one storage protrusion 90 can be disposed within the lid 22 to provide additional expanded portions 180 of the interior volume 60 of the cargo step pad 10. The expanded portions 180 can also be defined by a container 16 protrusion as well as the storage protrusion 90 within the lid 22.

The top surface 28 of the lid 22 can be further configured to allow water to drain off of the rear of the lid 22 and behind the rear wall 18 of the container 16 when the lid 22 is disposed in the open position 24. In this manner, as the lid 22 is moved to the open position 24, the lid 22 is contoured to substantially direct water on the lid 22. Additional drain channels 80 can be disposed on the lid 22 to further direct water off from the top surface 28 of the lid 22, behind the rear wall 18 of the container 16 and under the vehicle 12 when the lid 22 is in the open position 24. Moreover, the top surface 28 of the lid 22 is configured to be sloped such that the lid 22 has a generally downward slope away from the vehicle 12 when the lid 22 is in the closed position 26, and a generally downward slope toward the vehicle 12 when the lid 22 is in the open position 24. In this manner, the lid 22 if configured to direct water and debris away from the rim 20 of the container 16 in both the open and closed positions 24, 26.

In various embodiments, the cargo step pad 10 can be made of materials that can include, but are not limited to, plastic, composite, aluminum, steel, aluminum alloys, steel alloys, combinations thereof, and other substantially rigid and substantially sturdy materials that can support the weight of multiple occupants entering and exiting a vehicle 12. It is contemplated that the material used for the cargo step pad 10 can be coated with some corrosion resistant material, wherein such material includes, but is not limited to, epoxy, an electrocoating material, powder coating, or other corrosion resistant coating material.

Referring now to FIGS. 2-10, the lid 22 is hingedly coupled to the container 16 such that a hinge 100 is offset from the rear wall 18 of the container 16. It is contemplated that the hinge 100 is disposed proximate the inner surface 112 of the lid 22 such that a pivoting mechanism extends from the inner surface 112 of the lid 22 and extends through the container 16 to be hingedly coupled thereto to create the hinge 100 of the cargo step pad 10. In this manner, the hinge 100 is not externally exposed and is disposed under the lid 22 and within the interior volume 60 of the cargo step pad 10 to substantially prevent liquid, salt, and other corrosive materials from collecting on and around the hinge 100 that may cause damage to the hinge 100 and inhibit the operation of the cargo step pad 10. It is further contemplated that the hinge of the cargo step pad 10 will include first and second pivot points 102 disposed within the side walls 30 of the container 16. In such an embodiment, the pivot points 102 are positioned proximate each of the side walls 30 of the container 16 and do not substantially extend within the interior volume 60 of the cargo step pad 10, thereby maximizing the interior volume 60 of the cargo step pad 10.

Referring again to FIGS. 8 and 9, the offset positioning of the pivot points 102 of the cargo step pad 10 provides for a minimal opening clearance between the container 16 and lid 22 such that when the lid 22 is moved from the closed position 26 to the open position 24, a portion of the lid 22 moves behind the rear wall 18 of the container 16 and below the rim 20 of the container 16. In this manner, when the lid 22 is in the open position 24, at least a portion of the rear wall 18 of the container 16 is positioned within a lid volume 110 defined by the inner surface 112 of the lid 22. It is contemplated that when the lid 22 is disposed in the open position 24, a portion of the lid 22 can be moved below and/or underneath the frame of the vehicle 12 and be tucked behind a portion of the rear wall 18 of the container 16 of the cargo step pad 10 to maximize the size of the opening 114 created by the lip 34 of the lid 22 and the rim 20 of the container 16 when lid 22 is in the open position 24, while also minimizing the space necessary between the cargo step pad 10 and the frame of the vehicle 12 to place the lid 22 in the open position 24.

Figures 13, 14:
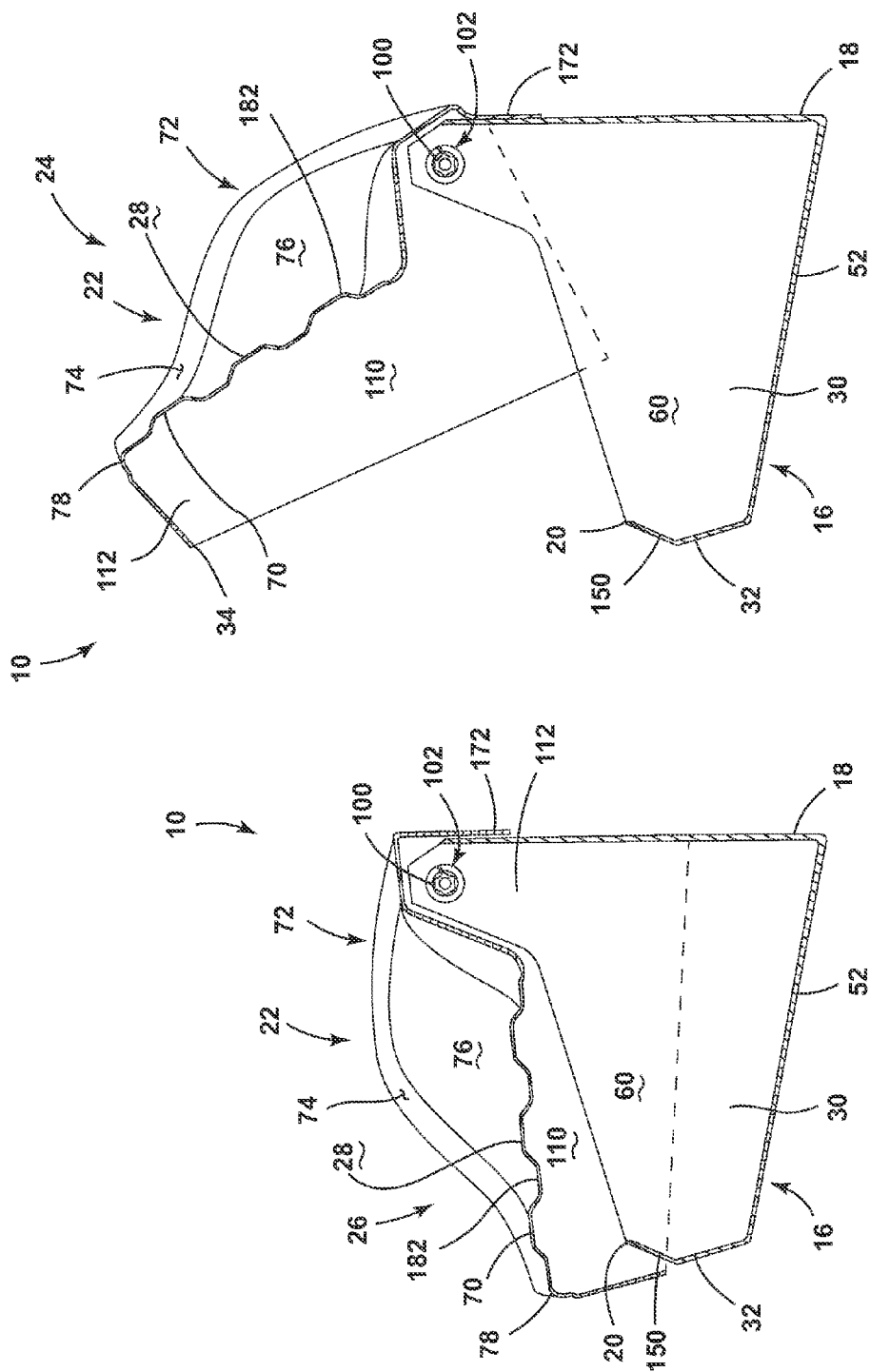
FIG. 13 is a cross-sectional view of an alternate embodiment of the cargo step pad with the lid in the open position.
FIG. 14 is a cross-sectional view of the cargo step pad of FIG. 13 with the lid in the closed position.

As illustrated in FIGS. 13-14, the location of the pivot points 102 within the cargo step pad 10 can vary. Where the pivot points 102 are positioned near the top surface 28 of the lid 22, the opening clearance between the cargo step pad 10 and the vehicle 12 can be less, as less of the lid 22 is positioned behind the rear wall 18 of the container 16 when the lid 22 is in the open position 24.

Figure 11:
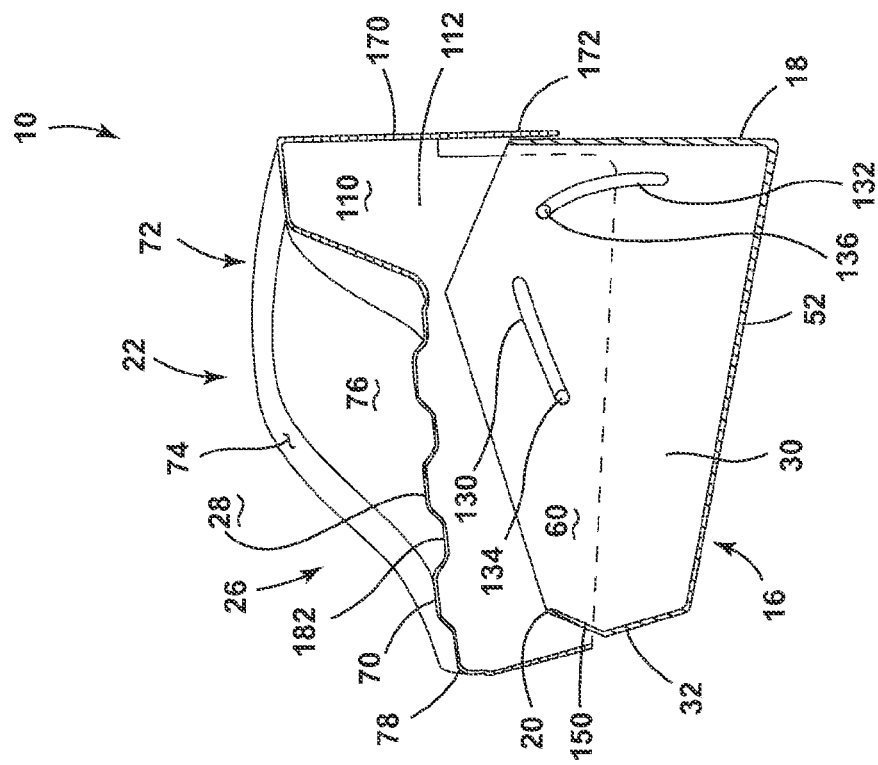
FIG. 11 is a cross-sectional view of an alternate embodiment of a cargo step pad with the lid in the open position.
Figure 12:
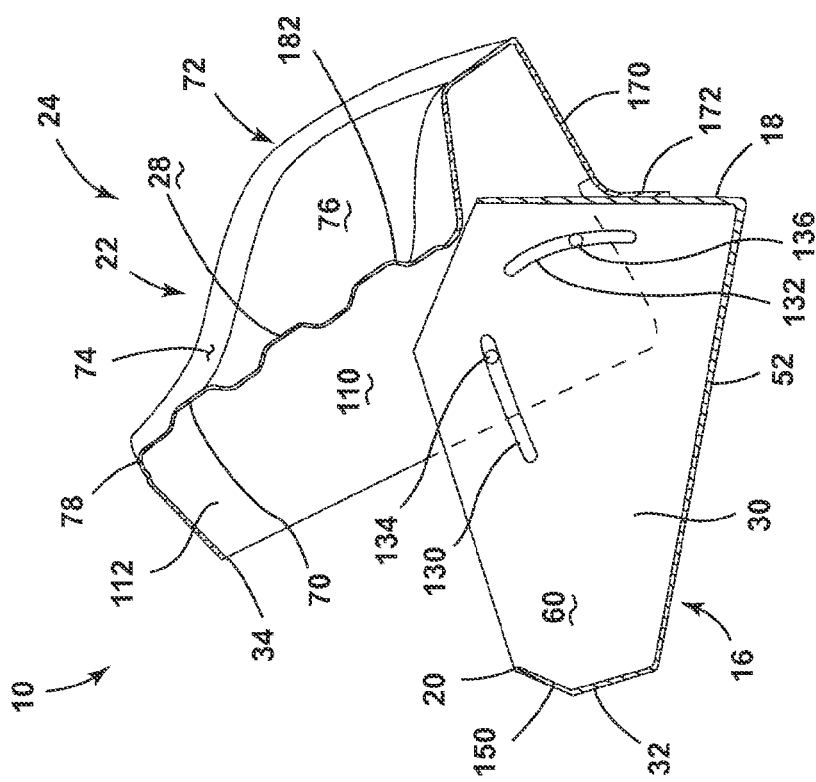
FIG. 12 is a cross-sectional view of the cargo step pad of FIG. 11 with the lid in the closed position.

Referring now to FIGS. 11 and 12, illustrating an alternate embodiment of the cargo step pad 10, the lid 22 is slidably coupled with the container 16. In such an embodiment, the side walls 30 of the container 16 each include at least one sliding channel, wherein each of the sliding channels is configured to receive at least one corresponding sliding member of the lid 22. It is contemplated that the sliding member can include, but is not limited to, a sliding pin, tab, protuberance or similarly configured feature. In this configuration, the sliding channels in each of the at least one corresponding sliding members is configured to define the open and closed positions 24, 26 of the lid 22, wherein as the sliding member moves along the sliding channel, the lid 22 moves between open and closed positions 24, 26. In this embodiment, as the lid 22 moves from the closed position 26 to the open position 24, the sliding members which engage the sliding channels slide through the sliding channels and position at least a portion of the lid 22 behind the back wall of the container 16 and below the rim 20 of the container 16, such that the lid 22 is tucked behind the container 16.

As shown in FIGS. 11 and 12, first and second sliding channels 130, 132 can be included in each side of the container 16 and the lid 22 includes corresponding first and second sliding members 134, 136 that engage the first and second sliding channels 130, 132. The first and second sliding channels 130, 132 allow the lid 22 to be opened such that as the lid 22 is moved into the open position 24, the front of the lid 22 moves along one upward and lateral arcuate path defined by the first sliding channel 130 and the first sliding member 134. At substantially the same time, the rear of the lid 22 moves along a separate lateral and downward arcuate path defined by the second sliding channel 132 and the second sliding member 136.

Figure 16:
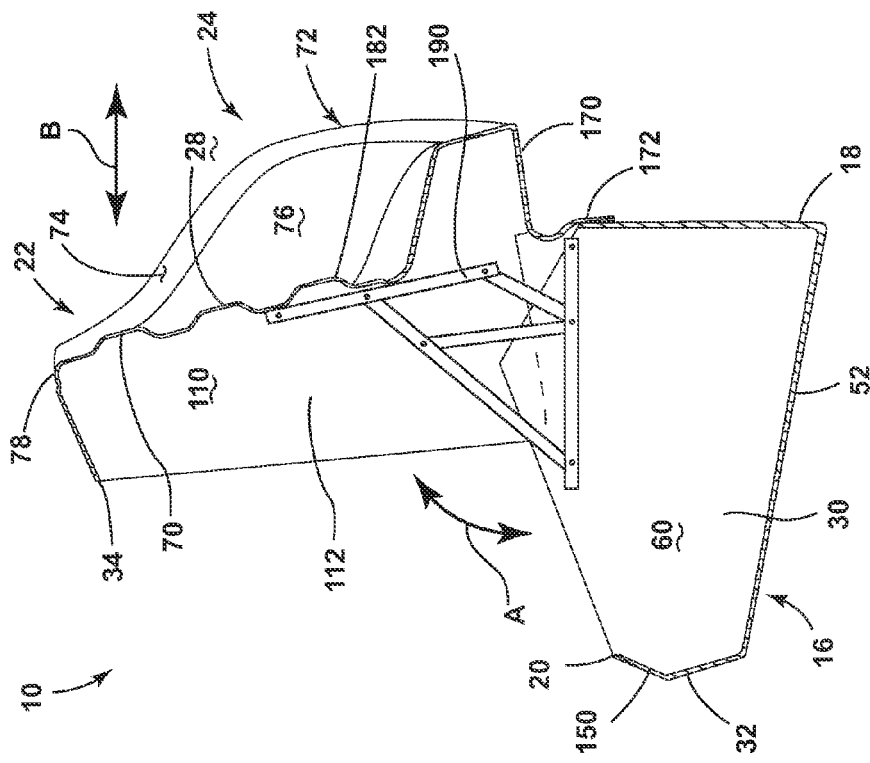
FIG. 16 is a cross-sectional view of the cargo step pad of FIG. 15 with the lid in the closed position.
Figure 15:
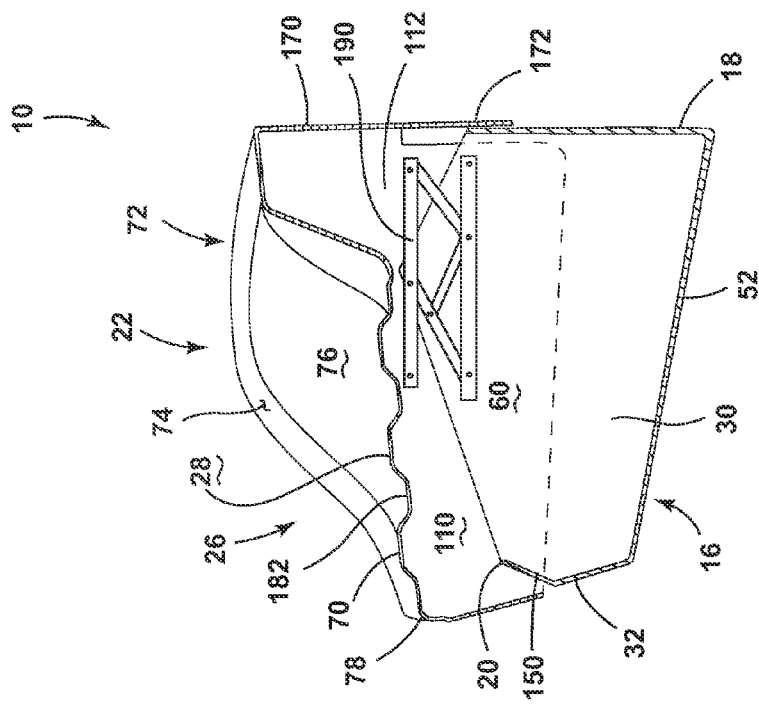
FIG. 15 is a cross-sectional view of an alternate embodiment of the cargo step pad with the lid in the open position.

As illustrated in FIGS. 15 and 16, the cargo step pad 10 can include a casement-type hinge 190 that is configured to place the lid 22 of the cargo step pad in the open position 24 by rotating the lid 22, along rotating path "A," while also laterally translating the lid 22 along path "B," such that minimal clearance is necessary between the cargo step pad 10 and the vehicle 12. This configuration can result in a portion of the lid 22 being disposed within the container 16 as the lid 22 is rotated and moved laterally into the open position 24 as described above. This compound rotational and lateral movement of the lid 22 can be achieved through other hinge mechanisms, the sliding configuration discussed above and shown in FIGS. 11 and 12, as well as other similar assemblies.

As with previous embodiments, this configuration minimizes the opening clearance kinematics necessary to support a close proximity between the container 16 and the lid 22 as the lid 22 moves to the open position 24 behind the container 16 and under the frame of the vehicle 12. In this manner, the distance between the cargo step pad 10 and the frame of the vehicle 12 is kept to a minimum while also allowing a maximum opening 114 of the cargo step pad 10 to access the interior volume 60 of the cargo step pad 10.

In various embodiments, alternate hinge mechanisms can be used to couple the lid 22 to the container 16. These alternate hinges can include, among others, offset hinges and piano hinges. Also, it is contemplated that the hinge 100 and sliding mechanisms of the cargo step pad 10, as discussed above, can include various rotating mechanisms and/or materials to assist with the movement of the lid 22 between the open and closed positions 24, 26. These rotating mechanisms and/or materials can include, but are not limited to, motors, bearings, lubricants, hydraulic mechanisms, pneumatic mechanisms, combinations thereof, and other mechanisms and materials that can assist in the movement of the lid 22. It is also contemplated that the various components of the hinge 100 and sliding mechanisms that are disposed on the lid 22, can be disposed on the container 16, and vice versa.

It is also contemplated that the cargo step pad 10 can include a locking mechanism that is configured to substantially secure the lid 22 in the closed position 26. Locks used on the cargo step pad 10 can be operated by keys, a key fob, or other remote keyless entry system, RFID, latches, clasps, touch pads, combination devices, or other similar lock-operating devices.

Referring again to FIGS. 4-12, the lid 22 of the cargo step pad 10 is configured to substantially overlap the container 16 on all sides, such that when the lid 22 is in the closed position 26, the lid 22 substantially encloses the container 16 and extends beyond the rim 20 and/or the outer surface 36 of the sides of the container 16, thereby substantially preventing water, slush, snow, salt, and other debris and material from entering the container 16 when the cargo step pad 10 is in the closed position 26. It is contemplated that the front wall 32 of the container 16 will include a chamfered portion 150 to allow the lid 22 to freely operate between the open and closed positions 24, 26 without the lid 22 colliding with the container 16.

Referring again to FIGS. 2-6, the lid 22 includes cutouts 160 that are configured to receive portions of the step pad frame 50 when the lid 22 is moved to the open position 24. These cutouts 160 are positioned such that water or other fluid material that falls upon the lid 22 of the cargo step pad 10 is directed away from the container 16 such that substantially all of the water that falls upon the lid 22 runs off from the lid 22 and away from the container 16. It is contemplated that the cutouts 160 of the lid 22 can include an operable sealing member 162 that is configured to receive the step pad frame 50 when the lid 22 is in the open position 24 and substantially form around the step pad frame 50 to maintain the substantially watertight seal around the step pad frame 50 when the lid 22 is in the open position 24. Such an operable sealing member 162 can also remain substantially watertight when the lid 22 is in the closed position 26. The operable sealing member 162 can also include two opposing membranes that engage along a center seam 164 such that as the operable sealing member 162 engages the step pad frame 50, the areas of the opposable membranes engage the step pad frame 50, separate at the center seam 164 and substantially conform to the profile of the step pad frame 50. It is also contemplated that the back panel 170 of the lid 22 can also include a sealing membrane 172 that is configured to extend downward from the back panel 170 of the lid 22 and below the rim 20 of the container 16 proximate the rear wall 18 of the container 16. This sealing membrane 172 is configured to flex as the lid 22 is moved from the closed to the open position 24, thereby maintaining a substantially watertight seal at the back side of the cargo step pad 10. It is further contemplated that the sealing membrane 172 can also be connected to the rear wall 18 of the container 16 such that the sealing membrane 172 can flex as the lid 22 is moved between the open and closed positions 24, 26, while also being connected to the lid 22 and the container 16. In various embodiments, the operable sealing member 162 and the sealing membrane 172 described above, can be made of various flexible and water resistant materials that can include, but are not limited to, rubber, plastic, silicone, and other various flexible plastic and substantially watertight materials.

Referring again to FIGS. 1, 2, 4 and 10, the cargo step pad 10 can include the storage protrusion 90 that defines an expanded portion 180 of the interior volume 60 of the cargo step pad 10. Typically, the cargo step pad 10 is configured to store and secure substantially elongated items due to the elongated configuration of the cargo step pad 10. These items typically include lumber, elongated equipment, tools and materials, athletic equipment, and the like. It is contemplated that the storage protrusion 90 and the corresponding expanded portion 180 is configured to receive bulkier items or bulkier portions of elongated items for easier storage and transport. Such items can include, but are not limited to, the reel of a fishing rod, tackle boxes, athletic balls and other various bulkier athletic equipment, construction materials, tools, and other bulkier items that may not fit within the elongated portions of the cargo step pad 10. It is contemplated that the cargo step pad 10 can include a plurality of storage protrusions 90 along the cargo step pad 10 or can include one large storage protrusion 90 that can extend the length of the cargo step pad 10. In such an embodiment, the stepping pad 182 available to the user when entering and exiting the vehicle 12 can be limited. As such, the top surface 28 of the lid 22 at the storage protrusion 90 that extends the length of the cargo step pad 10 can incorporate additional ridges, textures, traction surfaces, or other similar features that allow the storage protrusion 90 to be used as part of the stepping pad 182 for the user of the cargo step pad 10.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown in multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of the wide variety of materials that provide sufficient strength or durability, in any of the wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is to be understood that variations and modifications can be made on the aforementioned structure and methods without departing from the concepts of the present invention, and further it is to be understood that such concepts are intended to be covered by the following claims unless these claims by their language expressly state otherwise.

What is claimed is:

1. A vehicular cargo step pad comprising:
   a container having a rear wall at least partially defining a container rim; and
   a lid operable between open and closed positions, wherein a portion of a top of the lid is positioned below the container rim and behind the rear wall when the lid is in the open position, and wherein the lid includes cutouts configured to engage a step pad frame when in the open position.

2. The vehicular cargo step pad of claim 1, wherein the container rim is further defined by side walls and a front wall, and wherein the closed position is defined by a lip of the lid extending beyond an outer surface of the front, side and rear walls of the container.

3. The vehicular cargo step pad of claim 1, wherein the lid is coupled to the container at a hinge offset from the rear wall of the container.

4. The vehicular cargo step pad of claim 3, wherein the hinge is disposed in the sidewalls of the container.

5. The vehicular cargo step pad of claim 1, wherein the lid is slidably coupled with the container.

6. The vehicular cargo step pad of claim 5, wherein the side walls of the container include sliding channels, each of the sliding channels configured to receive at least one corresponding sliding pin of the lid, wherein the sliding channels and each at least one corresponding sliding pin is configured to define the open and closed positions of the lid.

7. The vehicular cargo step pad of claim 1, further comprising:
   a protrusion of the lid at least partially defining an expanded portion of an interior volume defined by the lid and the container.

8. The vehicular cargo step pad of claim 7, wherein the protrusion is disposed proximate a center pillar of a vehicle.

9. A vehicular cargo step pad comprising:
a container; and
a lid coupled to the container and operable between a closed position defined by an opening of the lid extending beyond an outer surface of the container, and an open position defined by a portion of a top of the lid being behind a rear wall of the container and below a rim of the container and cutouts of the lid engaging a step pad frame.

10. The vehicular cargo step pad of claim 9, wherein the lid is coupled to the container at a hinge offset from the rear wall of the container.

11. The vehicular cargo step pad of claim 10, wherein the hinge includes first and second pivot points disposed in sidewalls of the container.

12. The vehicular cargo step pad of claim 9, wherein the lid is slidably coupled with the container.

13. The vehicular cargo step pad of claim 12, wherein the side walls of the container include sliding channels, each of the sliding channels configured to receive at least one corresponding sliding pin of the lid, wherein the sliding channels and each at least one corresponding sliding pin is configured to define the open and closed positions of the lid.

14. The vehicular cargo step pad of claim 9, further comprising:
a protrusion of the lid at least partially defining an expanded portion of an interior volume defined by the lid and the container.

15. The vehicular cargo step pad of claim 14, wherein the protrusion is disposed proximate a center pillar of a vehicle.

16. A cargo step pad comprising:
a container having a bottom and a plurality of sidewalls defining an opening;
a lid coupled to the container and operable between a closed position, wherein the lid extends laterally beyond the opening, and an opened position, wherein at least a portion of a back wall of the container is positioned within a volume defined by the inner surface of the lid and at least one cutout of the lid engages a step pad frame.

17. The cargo step pad of claim 16, wherein the lid is coupled to the container at a hinge offset from the rear wall of the container.

18. The cargo step pad of claim 16, wherein the lid is slidably coupled with the container.

* * * * *